US008521079B2

(12) United States Patent
Burke et al.

(10) Patent No.: US 8,521,079 B2
(45) Date of Patent: Aug. 27, 2013

(54) RADIO SERVICE REGISTRY

(75) Inventors: Rodney Burke, Catonsville, MD (US); Steven Andrew Johnson, Ellicott City, MD (US); Joseph F. D'Angelo, Bedminster, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 708 days.

(21) Appl. No.: 11/962,752

(22) Filed: Dec. 21, 2007

(65) Prior Publication Data

US 2010/0056043 A1 Mar. 4, 2010

(51) Int. Cl.
*H04N 7/16* (2011.01)
*H04N 7/10* (2006.01)
*H04N 7/025* (2006.01)

(52) U.S. Cl.
USPC ............. 455/3.05; 725/135; 725/136; 725/40

(58) Field of Classification Search
USPC ............................................ 725/135, 136, 40
See application file for complete search history.

(56) References Cited

U.S. PATENT DOCUMENTS

| | | | | |
|---|---|---|---|---|
| 5,999,940 | A | 12/1999 | Ranger | |
| 6,292,568 | B1 | 9/2001 | Akins, III et al. | |
| 6,959,326 | B1 | 10/2005 | Day et al. | |
| 6,996,544 | B2 | 2/2006 | Sellars et al. | |
| 7,243,155 | B2 | 7/2007 | Bou-Ghannam et al. | |
| 7,319,870 | B2 * | 1/2008 | Olson et al. | 455/432.1 |
| 7,870,495 | B2 * | 1/2011 | Fablet | 715/760 |
| 7,908,172 | B2 | 3/2011 | Corts et al. | |
| 2002/0120685 | A1 | 8/2002 | Srivastava et al. | |
| 2002/0143819 | A1 * | 10/2002 | Han et al. | 707/513 |
| 2003/0163340 | A1 * | 8/2003 | Fitzpatrick et al. | 705/1 |
| 2004/0076188 | A1 | 4/2004 | Milbar et al. | |
| 2004/0111429 | A1 * | 6/2004 | Bou-Ghannam et al. | 707/104.1 |
| 2004/0131014 | A1 * | 7/2004 | Thompson et al. | 370/230 |
| 2005/0182825 | A1 | 8/2005 | Eytchison | |
| 2006/0053120 | A1 * | 3/2006 | Shum et al. | 707/100 |
| 2006/0174310 | A1 * | 8/2006 | Lee et al. | 725/135 |
| 2007/0011281 | A1 * | 1/2007 | Jhoney et al. | 709/220 |
| 2007/0050446 | A1 * | 3/2007 | Moore | 709/203 |
| 2007/0142022 | A1 * | 6/2007 | Madonna et al. | 455/352 |
| 2008/0235108 | A1 * | 9/2008 | Kulakowski et al. | 705/26 |
| 2009/0018998 | A1 * | 1/2009 | Patten et al. | 707/3 |
| 2009/0165032 | A1 * | 6/2009 | Burke et al. | 725/23 |
| 2011/0099060 | A1 * | 4/2011 | Litzow et al. | 705/14.44 |

FOREIGN PATENT DOCUMENTS

| | | | |
|---|---|---|---|
| EP | 1073222 | A2 | 1/2001 |
| EP | 1221818 | A1 | 7/2002 |
| EP | 1764974 | A1 | 3/2007 |
| WO | 03009592 | A1 | 1/2003 |
| WO | WO 2004/042972 | A2 | 5/2004 |
| WO | WO2005083917 | A1 | 9/2005 |

OTHER PUBLICATIONS

U.S. Appl. No. 11/963,049, filed Dec. 21, 2007, Burke et al.

* cited by examiner

*Primary Examiner* — Bobbak Safaipour
(74) *Attorney, Agent, or Firm* — Robert P. Lenart, Esq.; Pietragallo Gordon Alfano Bosick & Raspanti, LLP

(57) ABSTRACT

A service registry for a radio broadcasting system includes a memory for storing information relating to services to be provided over the broadcasting system, a processor coupled to the memory, and a core interface for exchanging messages between the processor and a plurality of users, the processor being programmed to retrieve the information from the memory in response to the messages received on the interface, and to output the retrieved information to an importer. A method of broadcasting and a broadcasting system are also provided.

15 Claims, 10 Drawing Sheets

RADIO SERVICE REGISTRY

FIELD OF THE INVENTION

This invention relates to broadcasting systems and methods for managing the delivery of services using broadcasting systems.

BACKGROUND OF THE INVENTION

The iBiquity Digital Corporation HD Radio™ system is designed to permit a smooth evolution from current analog Amplitude Modulation (AM) and Frequency Modulation (FM) radio to a fully digital In-Band On-Channel (IBOC) system. This system delivers digital audio and data services to mobile, portable, and fixed receivers from terrestrial transmitters in the existing Medium Frequency (MF) and Very High Frequency (VHF) radio bands. Broadcasters may continue to transmit analog AM and FM simultaneously with the new, higher-quality, and more robust digital signals, allowing themselves and their listeners to convert from analog to digital radio while maintaining their current frequency allocations.

The HD Radio system allows multiple services to share the broadcast capacity of a single station. One feature of digital transmission systems is the inherent ability to simultaneously transmit both digitized audio and data. Thus the technology also allows for wireless data services from AM and FM radio stations. First generation (core) services include a Main Program Service (MPS) and the Station Information Service (SIS). Second generation services, referred to as Advanced Application Services (AAS), include new information services providing, for example, multicast programming, electronic program guides, navigation maps, traffic information, multimedia programming and other content.

The HD Radio system provides a platform for the delivery of a wide range of services, both audio and data. However, in order to efficiently manage the services, there is a need to identify the available services and the characteristics of the services, and to associate the services with the service providers.

SUMMARY OF THE INVENTION

In one aspect, the invention provides a service registry for a radio broadcasting system including a memory for storing information relating to services to be provided over the broadcasting system, a processor coupled to the memory, and a core interface for exchanging messages between the processor and a plurality of users, the processor being programmed to retrieve the information from the memory in response to the messages received on the interface, and to output the retrieved information to an importer.

In another aspect, the invention provides a method including: storing salable packages of information in a service registry, transmitting the salable packages of information and a license key from the service registry to a broadcaster, and broadcasting the salable packages as authorized by the license key.

In another aspect, the invention provides a broadcasting system that includes a transmitter and an importer, wherein the importer receives information from a service registry including conditional access content to be provided over the broadcasting system, and encrypts the conditional access content for subsequent broadcast by the transmitter.

DETAILED DESCRIPTION OF THE INVENTION

In one aspect, this invention provides a central repository for the storage and control of broadcast services, referred to as a service registry, to maintain consistency and uniqueness of services across the entire radio industry. The service registry provides service providers with the capability of identifying each of their services and their service offerings. In addition, the service registry facilitates license key management and distribution. In one aspect, the service registry facilitates the sharing of service metadata related to data services and subscription-based conditional access services for an HD Radio system.

Figure 1:
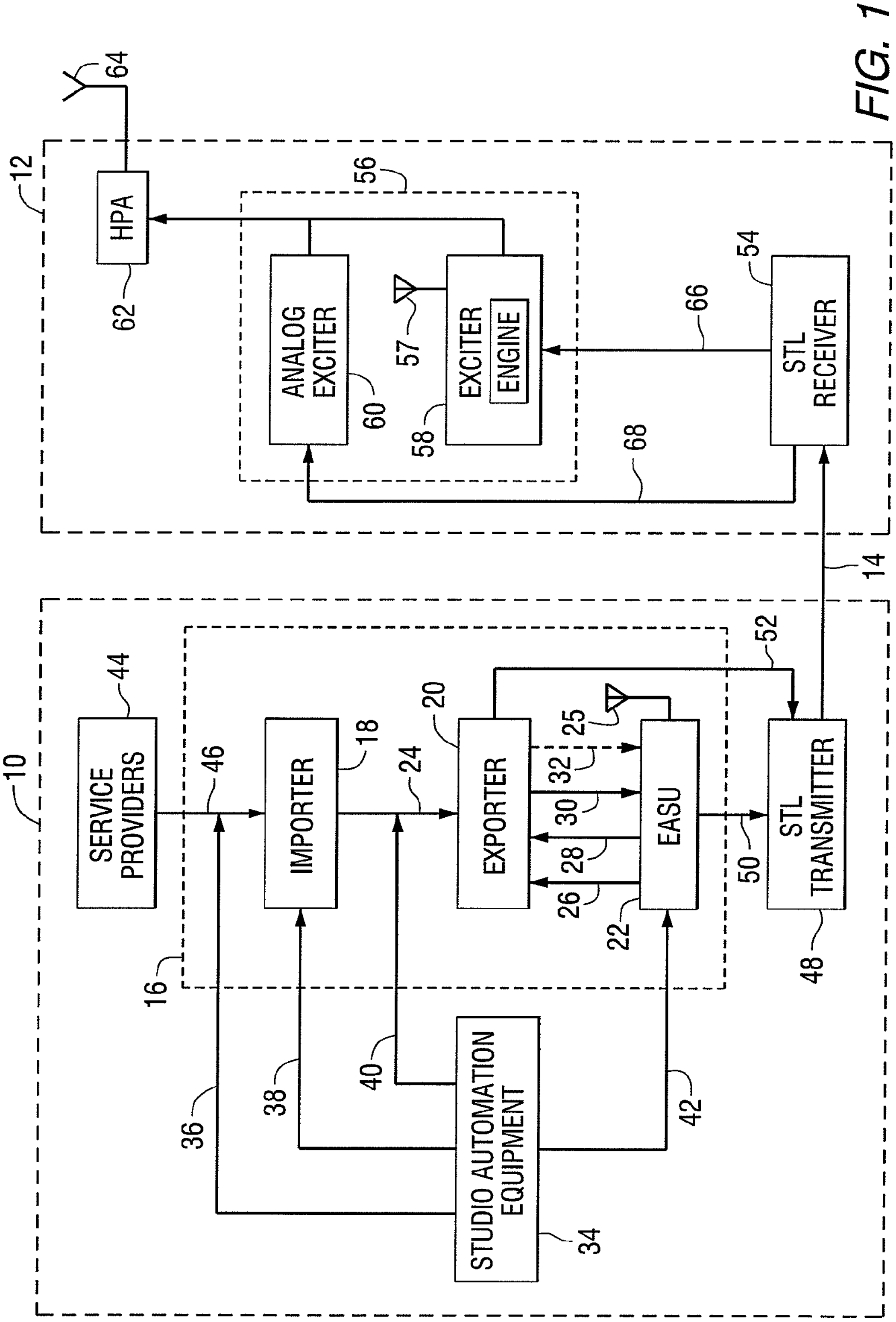
FIG. 1 is a block diagram of a transmitter for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC digital audio broadcasting (DAB) signal. The studio site includes, among other things, studio automation equipment 34, an importer 18, an exporter 20, an exciter auxiliary service unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS or SPS. Examples of AAS data include real-time traffic and weather information, navigation map updates or other images, electronic program guides, multicast programming, multimedia programming, other audio services, and other content. The content for AAS can be supplied by service providers 44, which provide service data 46 to the importer. The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and station information service (SIS) for broadcasting. SIS provides station information, such as call sign, absolute time, position correlated to GPS, etc. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital 26 and one analog 28. The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1). The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

The HD Radio system provides audio services including multicasting and data services. These services can be transported through the system and processed by the receiver with minimal metadata information and support. However, an increasingly large number of advanced data services including, for example: navigation based services, subscription audio services, automotive based services, mobile entertainment updates, and subscription/targeted data services may be implemented in the HD Radio system. These services can be implemented in scenarios where a single service provider might wish to deploy multiple HD Radio services.

There is a need for a consistent method of broadcasting services over the HD Radio system. In addition, there is a need for a method of broadcasting services over the HD Radio system that provides for consistent retrieval of these services at the receiver, and can track usage of these advanced services given the wide range of advanced services that can be deployed with HD Radio broadcasting.

In one aspect, this invention provides a central repository that maintains and processes the HD Radio metadata elements used to describe and uniquely identify HD Radio service offerings by service providers, and to allow HD Radio receivers to uniquely identify services and provide the relevant user experience.

The service registry helps to maintain a consistent and non-duplicative set-up of services for the radio broadcast industry. For the importer, the role of the service registry includes sharing service information and global system parameters, and providing license activation.

Figure 2:
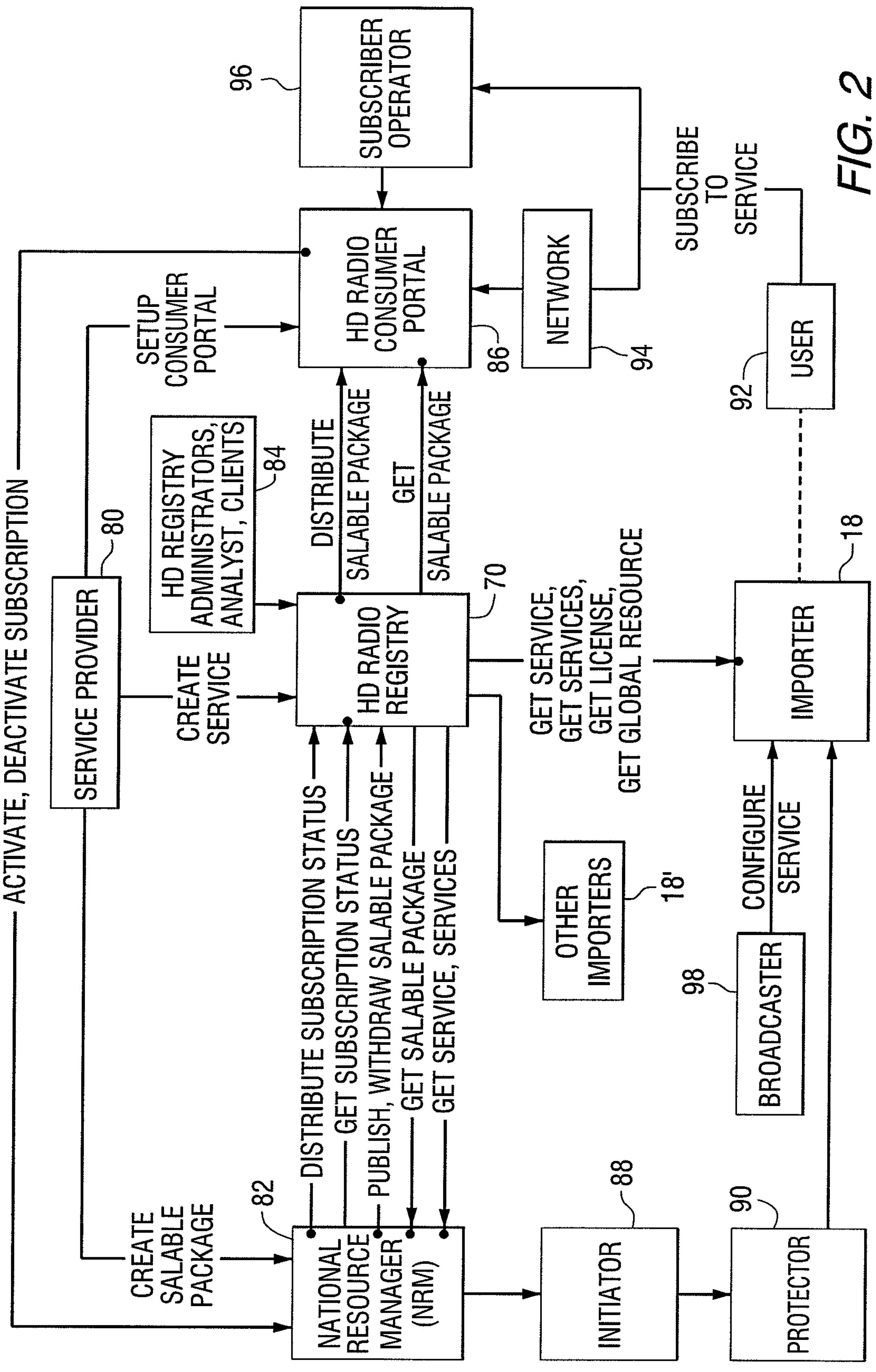
FIG. 2 is a schematic diagram that illustrates functional relationships among various entities and an HD Radio system capable of broadcasting conditional access signals.

FIG. 2 is a high level block diagram illustrating the service registry 70 and an importer 18 in the broadcast system architecture. The service registry interfaces with many entities, such as service providers 80, a national resource manager 82, administrators 84, and consumer portals 86, as well as the importer 18. The service registry also interfaces with other importers, represented schematically as block 18'.

Salable packages are created on the National Resource Manager (NRM) system by service providers. In practice, a service provider uses a NRM user interface to construct a salable package. In order for the salable package to be created, the NRM must obtain a service definition from the service registry. This can be accomplished during salable package construction, when the service provider enters (or selects from a list) the service ID (obtained from prior construction of the service at the service registry). Once the service definition is obtained, the salable package can be created. After the salable package is created on the NRM, the NRM sends (publishes) the salable package definition to the service registry, where it is made available to other entities such as the consumer portal. "Publishing" puts a read-only copy of the salable package on the service registry for other associated entities to view (e.g., the consumer portal). The national resource manager also exchanges other information with the service registry.

A salable package is a container for grouping related salable units associated with a given service. A salable package can include multiple salable units, and a salable unit can be associated with one salable package. A salable unit is a collection of broadcast units provisioned for subscription. Subscribers are contractually bound to a salable unit. A salable unit can include multiple broadcast units, depending on bandwidth constraints. For example, presently a broadcast unit can be associated with, at most, two salable units. Broadcast units identify the concrete over-the-air content being aired over one or more stations. A broadcast unit can include: list of broadcast stations authorized to carry the content, receiver-side routing and application processing requirements, and content identity and description.

The national resource manager also receives subscription information to activate or deactivate a subscription from consumers through a consumer portal. To activate a subscription, the national resource manager exchanges information with the service registry and sends an activation key to an initiator 88. The initiator transmits the key to a protector 90, which subsequently transmits the key to the importer. A user 92 subscribes to the service by, for example, either contacting the consumer portal through a network 94 or contacting a subscriber operator 96. A broadcaster 98 can also interact with the importer to configure services.

Subscription requests can be submitted to the consumer portal from a user (also called a listener or customer). The listener can interact with the consumer portal though a device that is capable of exchanging information with the subscription portal, such as a personal computer or other device. The user can use the HD Radio consumer portal to choose individual services, or one or more packages of services that are available from one or more service providers.

Service providers generate or provide content. The content can be conditional access content or non-conditional access content. The service registry can interface with service providers in order to register the service providers and to set up service provider accounts.

The service providers can specify service parameters that are used to define services or salable packages. The service parameters can include service provider registration information and service metadata information.

The service registry provides a central repository of service parameters and metadata for HD Radio services. The service parameters and metadata information is supplied by the registry to the broadcaster.

Metadata can include, for example, content type, MIME basic hash, a text information descriptor/call to action, a validity descriptor, and/or the service provider name. The content type can identify the genre of the audio or data service. The MIME basic hash can be used to associate the service provider/format with the application at the receiver.

HD Radio metadata/service parameters contain over-the-air signaling parameters sent over the HD Radio system to describe or identify a piece of content.

The metadata/service parameters are used in the set-up and broadcast of HD Radio services, and facilitate meaningful interpretation and processing at the receiver. The metadata information is used to uniquely identify and describe particular services transported over the HD Radio system.

For conditional access services, the broadcaster broadcasts an encrypted data stream that includes a decryption key needed by subscribers to decrypt services to which they are entitled. In one example, an importer at the broadcaster scrambles conditional access content, and a conditional access management system processes subscriber entitlements and provides keys for decrypting the scrambled content.

The HD Radio system provides the flexibility and capability to efficiently deliver service related metadata information from the service provider so that HD Radio receivers can quickly and efficiently discover the services broadcast over the system. Such receivers can then process the information and provide the relevant user-experience through associated application software residing at the receiver.

The service registry also allows radio broadcasters to define service offerings of their own and offers a consistent identification and transport of services over the HD Radio system. The importer combines this information with broadcast tokens received from the station administration to produce an encrypted data stream.

In this example, the service registry has both human user and machine-to-machine interfaces. Human interfaces include service provider, broadcaster, and subscriber operator interfaces. The machine-to-machine interfaces couple the service registry to the consumer portal, the national resource manager and the importer.

Figure 3:
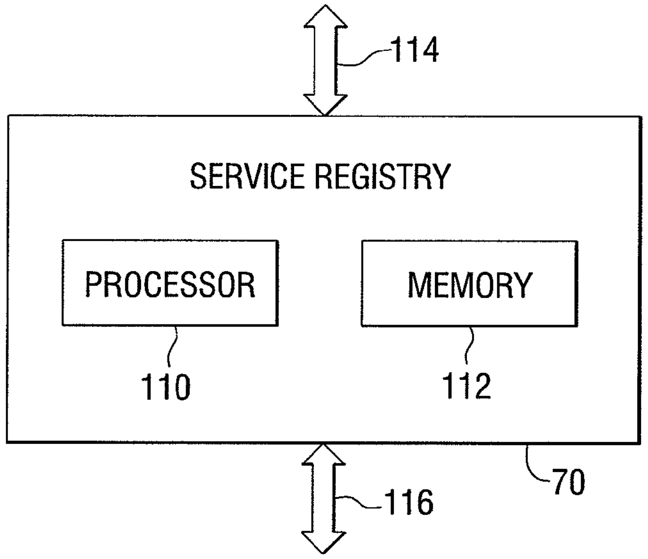
FIG. 3 is a block diagram of a service registry.

FIG. 3 is a block diagram of a service registry 70. The service registry includes a processor 110 and a memory or storage element 112. The processor exchanges information with various entities through a core interface 114 and a resource manager interface 116. The processor can be programmed to retrieve the information from the memory in response to commands received on the interfaces, and to output the retrieved information to the importer.

Figure 4A:
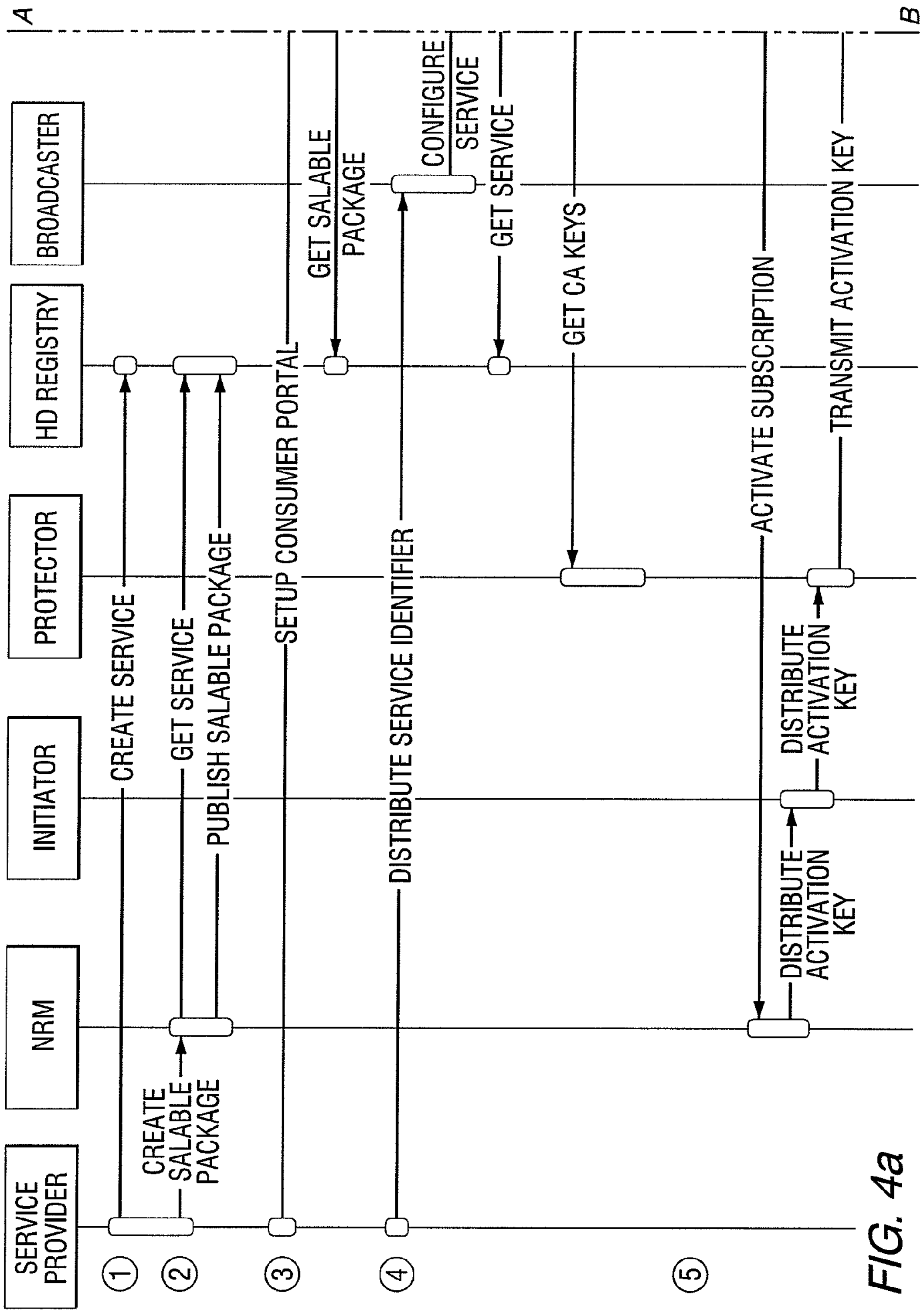
FIG. 4 is a schematic diagram that illustrates the exchange of information among various entities in a broadcasting system.
Figure 4B:
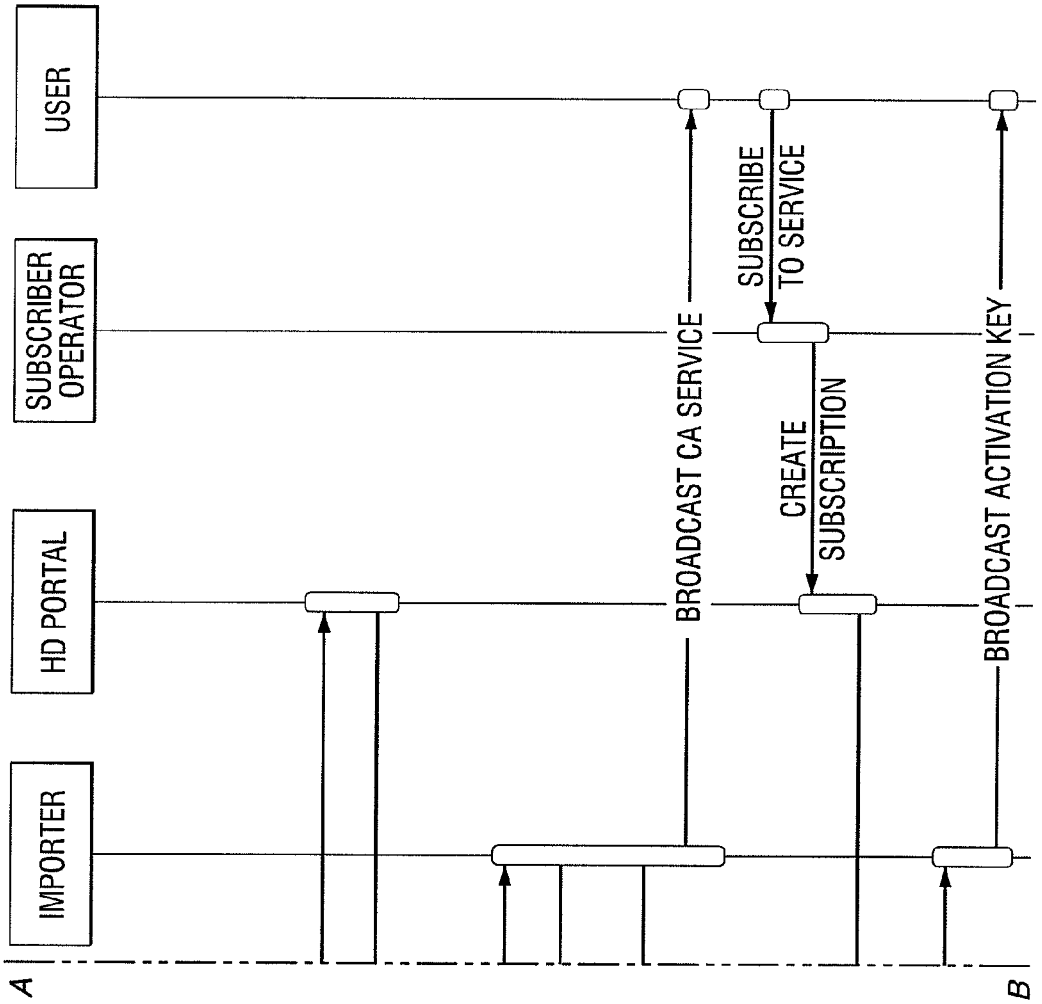

FIG. 4 is a schematic diagram that illustrates the exchange of information among various entities in a broadcasting system. As shown in FIG. 4, the service provider interacts with the national resource manager to create salable packages. The national resource manager sends the salable packages to the service registry. The service is provided in salable units.

A salable package is a container for salable units, can include multiple salable units, and a salable unit can be associated with one salable package.

The service provider also supplies setup information to the consumer portal and distributes a service identifier to a broadcaster. The setup information can include service, salable package, salable unit and broadcast unit identifiers and descriptions, and point-of-sale descriptors that can include salable unit cost and availability.

The national resource manager also distributes an activation key in response to a request from the consumer portal to activate a subscription.

The broadcaster configures the service for use in combination with the broadcaster's other broadcasting services.

The importer retrieves the service identifier from the service registry and retrieves conditional access keys from the protector.

A user subscribes to the service through the consumer portal, for example using either an operator or via a network. The consumer portal activates the subscription and informs the national resource manager that the subscription is active. The national resource manager distributes a subscription activation status message in response to an indication that a subscription is active.

The initiator receives the subscription-activated indication, generates an entitlement message on behalf of the activated subscriber and sends the entitlement to the protector. The protector transmits subscriber entitlement messages to the importer for over-the-air broadcast, which allows a subscriber's radio to receive the subscription content. The protector also transmits service content encryption keys to the importer to encrypt subscription service content and entitlement control messages, for over-the-air broadcast. The entitlement control message is used by radio receivers, in conjunction with the entitlement, to generate a service content decryption key for valid subscribers.

The broadcaster then broadcasts the service in encrypted form to the subscriber, along with an activation key. The subscriber then uses the activation key in conjunction with the entitlement to decrypt the service information.

Service providers can have many services, but a service can only be associated with one service provider. A service can be associated with many salable packages, but a salable package can only be associated with one service. In general, there's a one-to-one relationship between a service and a salable package.

A salable unit can include multiple broadcast units (e.g., stations that carry a specific content item). Subscribers are contractually bound to a salable unit.

A subscriber can subscribe to multiple salable units and conversely, a salable unit can be associated with many subscribers. A radio ID is an identifier that identifies a particular radio receiver. A subscriber can have multiple radio IDs.

The service registry also manages broadcast tokens, which control access to the services. Many broadcast tokens can be used on a single importer and vice-versa; many importers can use the same broadcast token. A commonly owned U.S. Patent Application, filed on the same day as this application and titled "Method and Apparatus For Managing Broadcasting Services Using Tokens" provides additional information relating to broadcast tokens, and is hereby incorporated by reference.

Core User Interface

Figure 5A:
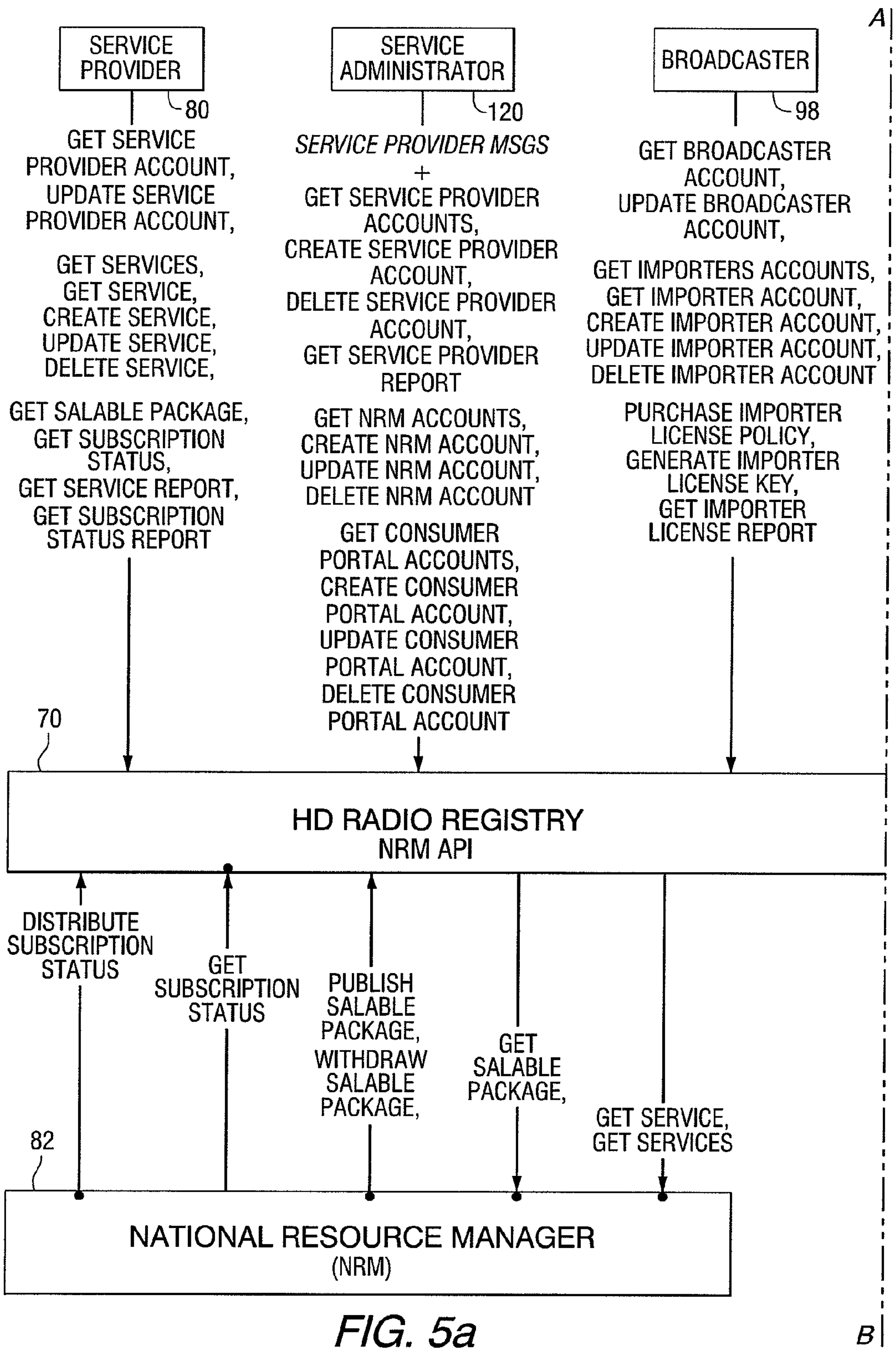
FIG. 5 is a schematic diagram that illustrates the information that may be exchanged among various entities and the service registry.
Figure 5B:
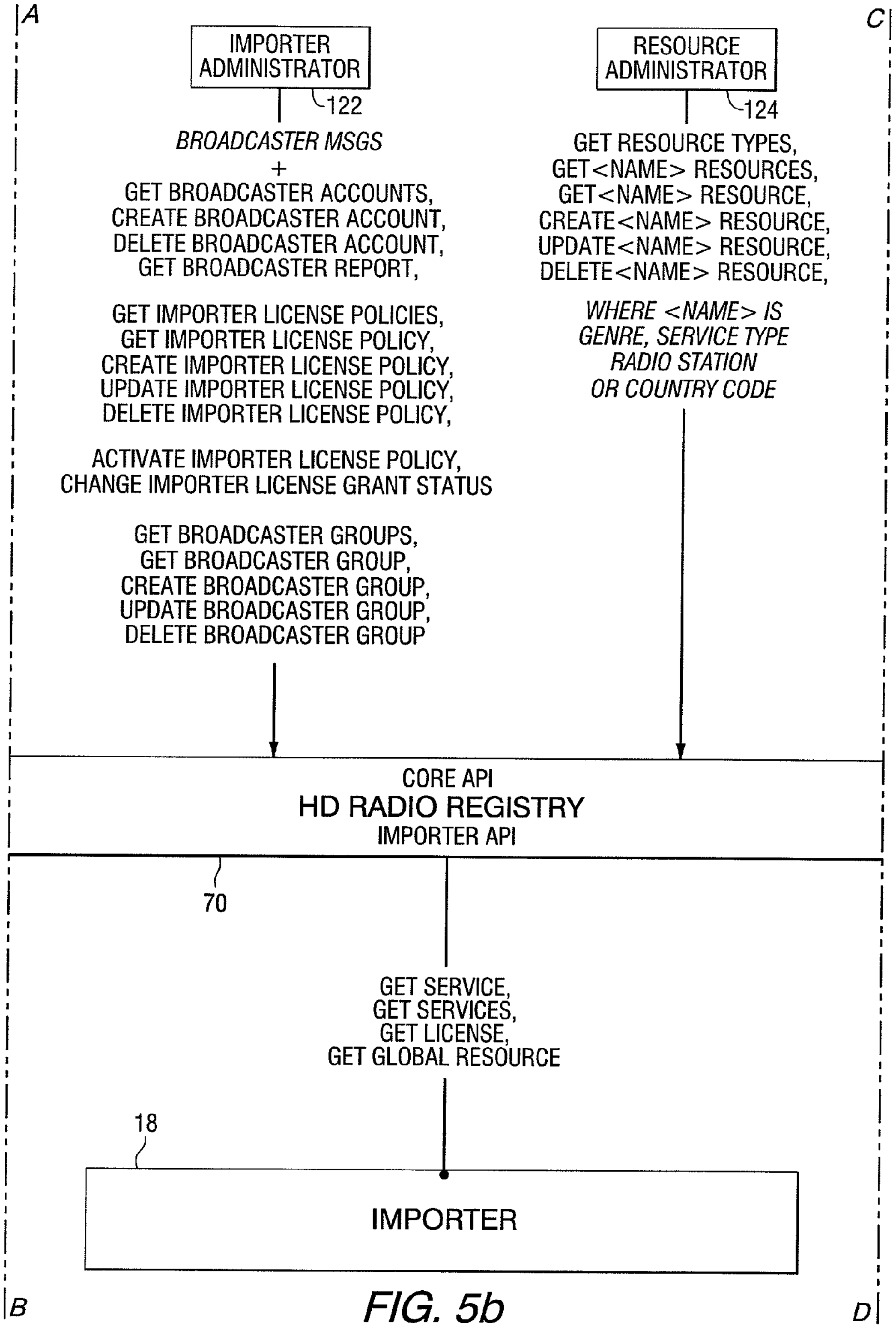
Figure 5C:
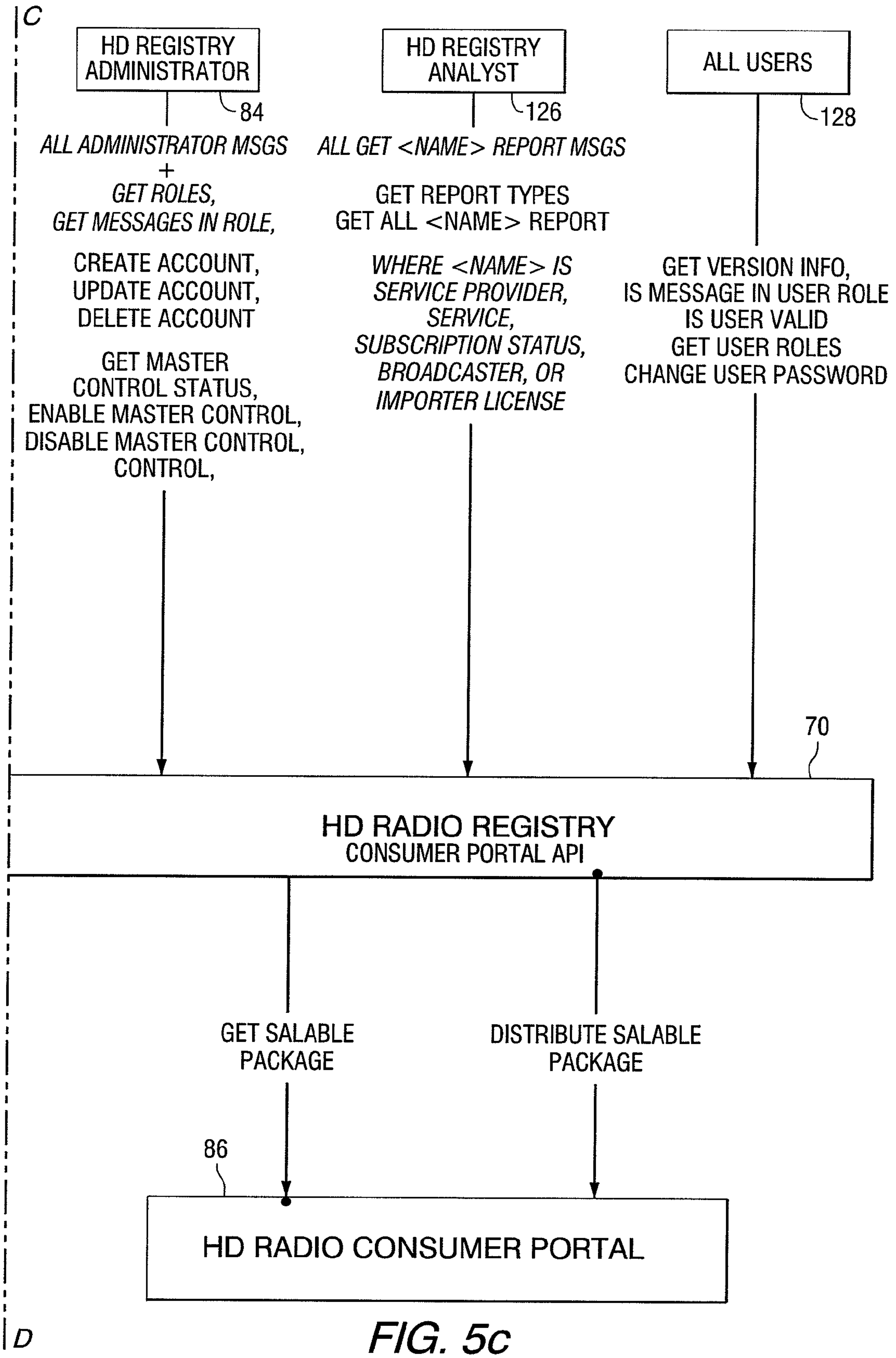

The service registry can have several types of users, such as broadcasters, service providers, administrators, and analysts. FIG. 5 shows the various users and the messages exchanged between the registry and the users.

The users include:

- service providers 80—create and manage their own services
- service administrators 120—manage service provider and services
- broadcasters 98—create and manage their own importers
- importer administrator 122—manages broadcasters and importers
- resource administrator 124—manages shared resources
- service registry administrator 84—power-user which manages all accounts
- service registry analyst 126—generates and analyzes user and business level reports.

A separate block 128, labeled all users, identifies messages that apply to all types of users (e.g., service provider, service administrator, broadcaster, etc). All users can authenticate accounts and get registry build information.

Users can exchange messages with the service registry over a core interface using a Simple Object Access Protocol (SOAP) or directly via XML using a dedicated registry client application. SOAP messages can be exchanged via secure Hyper Text Transfer Protocol (HTTPS). Non-SOAP messages contain an HD Radio-Envelope.

SOAP messages can include an authentication element that contains username and password parameters which are used to authenticate the message requester. An HD Radio-Envelope contains the service registry application messages.

The application program interfaces (API) employ a common message structure, and an API Message Definition, which defines specific API messages.

The main common message structure element is the HD Radio-Envelope. Subsequently, a Registry-Message element is specified, which contains an HD Radio Registry Message structure. A Uniform Resource Indicator (URI) can be provided for the HD Radio Registry importer messages.

The HD Radio-Envelope can be encapsulated within the SOAP body element.

The core service registry interface messages can be organized in the following functional groups:

- Resource Messages
- Account Messages
- Importer and Broadcaster Messages
- Service Messages
- General Messages Various messages that can be exchanged among entities of FIG. 5 are described below in example format. That is, the parameters and data values are for illustrative purposes only.

Although not shown in the following message descriptions, each message may be contained within a SOAP body and may contain an authentication element within the SOAP header.

Resource related messages can include:

- Get Resource Types
- Genre Resource Messages:
  - GetGenreResources
  - GetGenreResource
  - CreateGenreResource
  - UpdateGenreResource
  - DeleteGenreResource
- Service Type Resource Messages:
  - GetServiceTypeResources
  - GetServiceTypeResource
  - CreateServiceTypeResource
  - UpdateServiceTypeResource
  - DeleteServiceTypeResource
- Radio Station Resource Messages:
  - GetRadioStationResources
  - GetRadioStationResource
  - CreateRadioStationResource
  - UpdateRadioStationResource
  - DeleteRadioStationResource
- Country Code Resource Messages:
  - GetCountryCodeResources
  - GetCountryCodeResource
  - CreateCountryCodeResource
  - UpdateCountryCodeResource
  - DeleteCountryCodeResource Account related messages can include:

- User and Role Messages:
  - GetRoles
  - GetMessagesInRole
  - IsMessageInUserRole
  - IsUserValid
  - GetUserRoles
  - ChangeUserPassword
- Account Messages:
  - GetAccount
  - GetAccounts
  - CreateAccount
  - UpdateAccount
  - DeleteAccount
- Broadcaster Account Messages:
  - GetBroadcasterAccounts
  - GetBroadcasterAccount
  - CreateBroadcasterAccount
  - UpdateBroadcasterAccount
  - DeleteBroadcasterAccount
- Service Provider Account Messages:
  - GetServiceProviderAccounts
  - GetServiceProviderAccount
  - CreateServiceProviderAccount
  - UpdateServiceProviderAccount
  - DeleteServiceProviderAccount
- Importer OEM Account Messages:

GetImporterOEMAccounts
GetImporterOEMAccount
CreateImporterOEMAccount
UpdateImporterOEMAccount
DeleteImporterOEMAccount Conditional Access NRM Account Messages:

GetNRMAccounts
GetNRMAccount
CreateNRMAccount
UpdateNRMAccount
DeleteNRMAccount

HD Consumer Portal Account Messages:

GetConsumerPortalAccounts
GetConsumerPortalAccount
CreatConsumerPortalAccount
UpdateConsumerPortalAccount
DeleteConsumerPortalAccount Importer Account Messages:

GetImporterAccounts
GetImporterAccount
CreatImporterAccount
UpdateImporterAccount
DeleteImporterAccount Importer and Broadcaster messages can include:

Broadcast Group Messages:

GetBroadcastGroups
GetBroadcastGroup
CreateBroadcastGroup
UpdateBroadcastGroup
DeleteBroadcastGroup Importer License Policy Messages:

GetImporterLicensePolicies
GetImporterLicensePolicy
CreateImporterLicensePolicy
UpdateImporterLicensePolicy
DeleteImporterLicensePolicy Importer License Key Management Messages:

ActivateImporterLicensePolicy
PurchaseImporterLicensePolicy
GenerateImporterLicenseKey
ChangeImporterLicenseGrantStatus
GetImporterLicenseReport The Service messages can include:

Service Messages:

GetServices
GetService
CreateService
UpdateService
DeleteService

Salable Package Messages:

GetSalablePackage

Subscription Status Messages:

GetSubscriptionStatus

The General messages can include:

GetVersionInfo
GetMasterControlStatus
EnableMasterControl
DisableMasterControl

Examples of some of the core interface messages are presented below. There are many ways in which the messages can be described, implemented and communicated. It should be understood that the invention is not limited to any particular message description, implementation or communication scheme.

The Get Resource Type message can be issued to get a list of the various resources managed on the service registry. This message request would typically be used when a resource is added or listed.

The Get Genre Resources message returns a list of genres from the service registry.

The Get Genre Resource message returns the details of a specific genre resource from the service registry.

The Update Genre Resource message updates an existing genre resource in the service registry.

The Delete Genre Resource message removes an existing genre resource from the service registry.

The Get Service Type Resources message returns a list of Service Types from the service registry.

The Get Service Type Resource message returns the details of a specific genre resource from the service registry.

The Create Service Type Resource message adds a new Service Type resource to the service registry.

The Update Service Type Resource message updates an existing Service Type resource in the service registry.

The Delete Service Type Resource message removes an existing Service Type resource from the service registry.

The Get Radio Station Resources message returns a list of radio stations from the service registry.

The Get Radio Station Resource message returns the details of a specific radio station resource from the service registry.

The Create Radio Station Resource message adds a new radio station resource to the service registry.

The Update Radio Station Resource message updates an existing radio station resource in the service registry.

The Delete Radio Station Resource message removes an existing radio station resource from the service registry.

The Get Country Code Resources message returns a list of genres from the service registry.

The Get Country Code Resource message returns the details of a specific country code resource from the service registry.

The Create Country Code Resource message adds a new country code resource to the service registry.

The Update Country Code Resource message updates an existing country code resource in the service registry.

The Delete Country Code Resource message removes an existing country code resource from the service registry.

The Get Global Resource message is issued by the importer to request an update of the globally defined HD Radio Global System parameters, such as Genre and Service Types. Typically, broadcasters would need to update the importer global definitions whenever a service is added.

Importer API Functions

The content delivery taxonomy and API functions for the importer to access and share service information with the service registry are described below.

The importer API includes the following messages:

GetService—get a specific service definition from service registry

GetServices—get list of services authorized for importer from service registry

GetGlobalResource—get global resource information from service registry

GetLicenseKey—get license activation key for importer from service registry.

Figure 6:
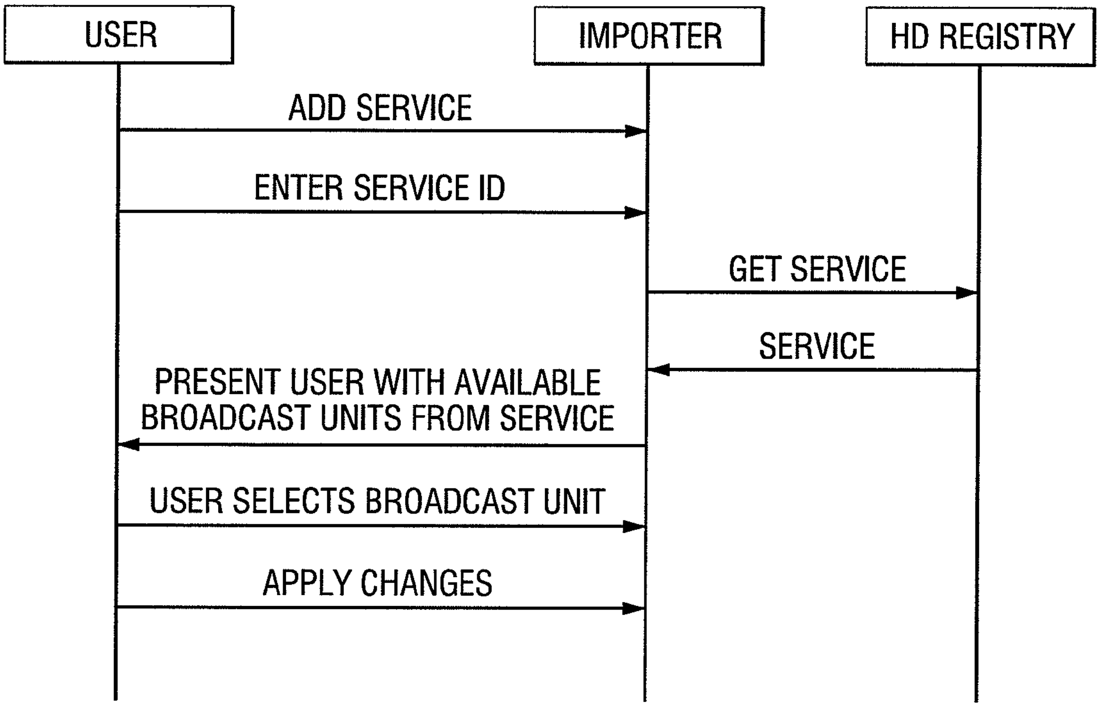
FIGS. 6-8 are schematic diagrams that illustrate the exchange of information among a broadcaster, an importer, and the service registry.
Figure 7:
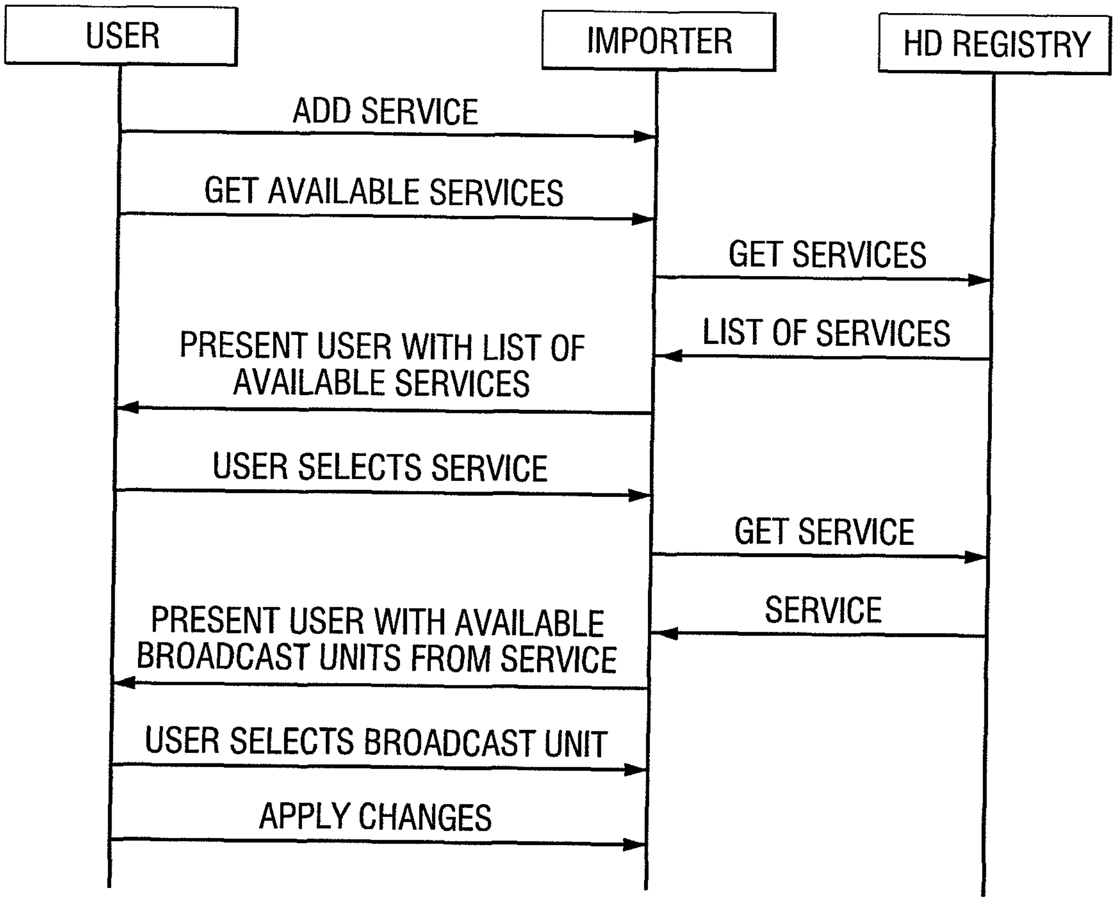

The Get Service message is issued by the importer to request a specific service definition, or all active services authorized for the importer, from the service registry. The message request would typically be generated when a service is added or updated. FIGS. 6 and 7 depict typical Get Service message flows.

The Get Global Resource message is issued by the importer to request an update of the globally defined HD Radio Global System parameters, such as Genre and Service Types. Typically, broadcasters would need to update the importer global definitions whenever a service is added via broadcast token and the service MIME type is not recognized by the importer.

The Get License Key message is issued by the importer to obtain a valid license activation key from the service registry.

Figure 8:
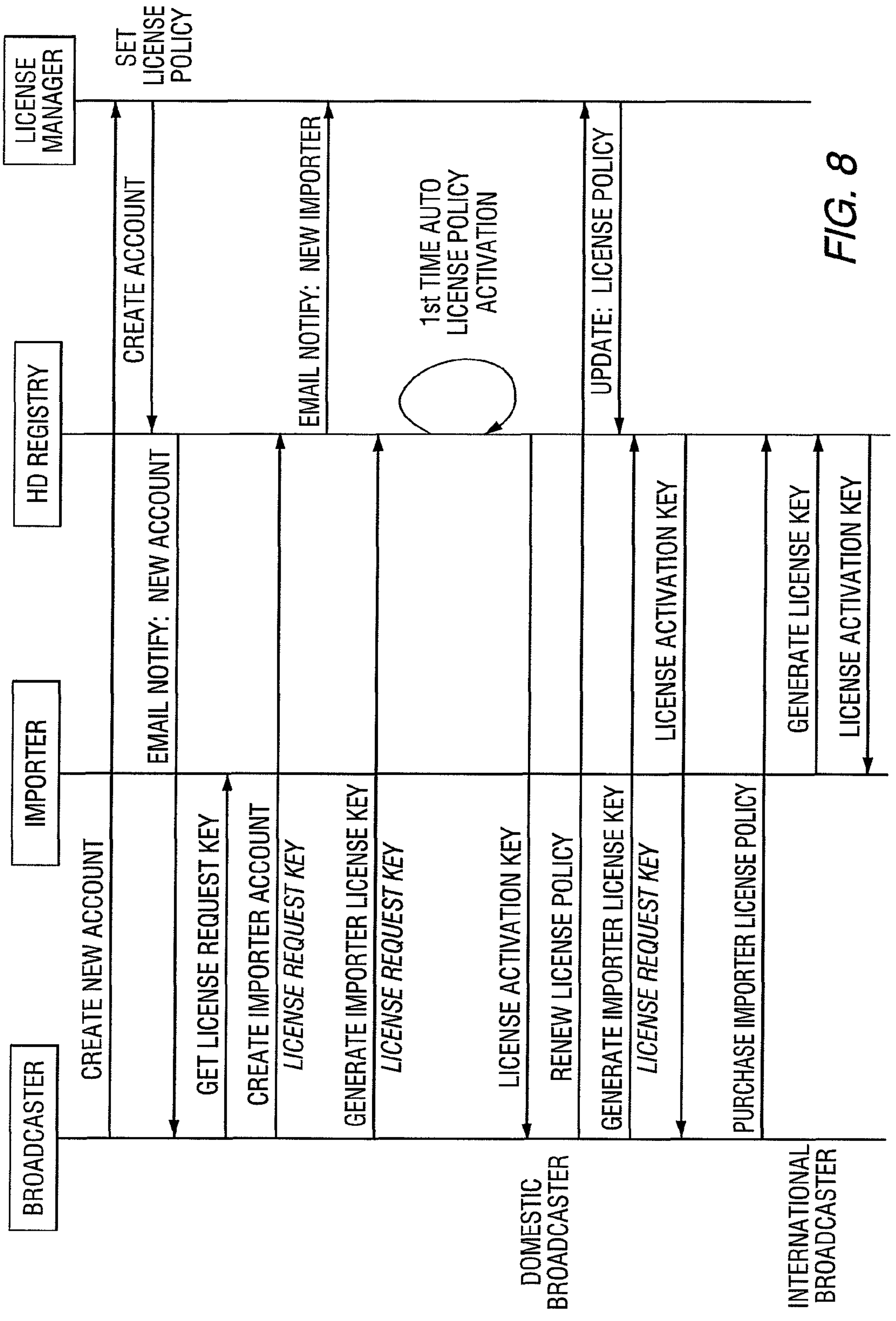

A typical license key activation is depicted in FIG. 8. The Get License Key retrieves an importer license key, which allows broadcasters to use their importers. This key is not related to services, subscribers, or conditional access. It is a separate functional role of service registry to Generate Importer License Keys. On the other hand, subscriber entitlement keys are used by conditional access components to allow radio listeners to receive subscription based content.

National Resources Manager API

The content delivery taxonomy and API functions for a National Resource Manager (NRM) to access and share service information with the service registry are described below. The interface includes the following messages:

Service Messages:
- Get Service—get a service definition from service registry
- Get Services—get list of services from service registry salable package messages
- Publish salable package—publish salable package on the service registry
- Get salable package—get previously published salable package from service registry
- Withdraw salable package—un-publish a salable package on the service registry Subscription Status Messages:
- Distribute Subscription Status—asynchronous notification of subscription activation status sent by NRM
- Get Subscription Status—get subscription activation status from NRM.

The Get Service message can be issued by the NRM to request a specific service definition from the service registry registered.

The Get Services message is issued by the NRM to request all active services for a given service provider from the service registry registered.

The Publish Salable Package message is issued by the NRM to publish a salable package definition with the service registry.

The Get Salable Package message is issued by the NRM to request a specific salable package that has been published at the service registry.

The Withdraw Salable Package message is issued by the NRM to request that a specific salable package be removed from the service registry.

The Distribute Subscription Status message is sent by the NRM to the service registry whenever a subscription status changes. For example, when a subscription is activated or deactivated, the status of more than one subscriber and subscription can be sent in a single status message.

The Get Subscription Status message is issued by the service registry and sent to the NRM to request subscription status. Status can be requested by radio-id or salable-unit-id. The service registry can handle and manage the service and business parameters. Business parameters that can be stored in the service registry include, for example, service provider name, service name, service package description, service description, content format, restriction, participating stations, subscription rate or price, contact details, billing system, and target receiver. The service name would be the commercial name of the service. The service package description can specify a number of services in a given service package. The service description describes the nature of the service. The content format describes the format of the service content, such as audio/data/stream/file-based. The restriction parameter indicates whether the service is free or a pay service. The participating stations can be the broadcasters/local stations that are carrying the service, or a network of stations. The subscription price contains pricing information for the service. The contract details contain provisions of the service provider's contract. The billing system contains information on the billing and SMS for the service provider. The target receiver indicates any association with particular receiver brands.

The service registry can work in close conjunction with the HD Radio conditional access management system to obtain and exchange information about service providers and their salable packages.

This service registry facilitates the development of business relationships with service providers. It also maintains a central repository for consistent use of metadata information across the system, so that radio broadcasters can be provided with a consistent set of metadata information for services to be broadcast.

The service registry gives service providers the capability to identify each of their services and their service offerings, and facilitates the efficient broadcast of these services and their processing at the receiver. The service registry can enable service providers to configure/modify services and service parameters based on how they want to define their salable packages.

The service registry can collect all the basic information about the service provider at the registration process. Once registered, the service provider can access its homepage directly upon login, to obtain a listing of their services and other features available in the service registry.

The service registry can also incorporate a use license for each user with designated sub-accounts.

For locally provided services, the station administrator can define an appropriate bandwidth contract at the local importer. The local service provider (e.g., the broadcaster) can also complete registration and acceptance criteria with the service registry. The broadcaster can input all the required service parameters (technical and business) describing its service offering via the local station administrator.

The importer can request a broadcast token from the service registry through the Station Administration identifying the piece of content. The importer validates the service (using the broadcast token), encrypts it and enables broadcast of the encrypted stream.

The service registry can support the registration of centralized service providers (non-broadcasters), as well as local broadcast stations (local service providers). To perform the registration, the service registry would collect all the basic information required to uniquely identify a particular service provider (centralized or local). Then the service registry would prompt the service providers to accept predetermined business and licensing terms for providing advanced services over the HD Radio system.

The service registry collects all of the appropriate service parameters required by the HD Radio system to describe a particular service/content and which enables efficient retrieval at the receiver. It also collects all the appropriate business parameters that describe a particular service offering/content, and can be used to manage and aggregate information used in advanced service offerings over the HD Radio system.

The service registry can include a database that can be used to supply/generate customized reports relating to registry activity. These reports may include for example: the number of registered service providers; the number of services of a particular type; the stations that are broadcasting a particular service; and pricing information for particular services.

The service registry database may also supply/generate customized reports that may be of interest to the service providers, both non-broadcaster and broadcaster. These reports may include: an identification of participating broadcasters, and valid broadcast of tokens for local stations. The service registry can provide online access to view customized reports.

The service registry database can be backed up and have minimum downtime. A mirror of the service registry may be maintained at a different location.

While the invention has been described in terms of several examples, it will be apparent to those skilled in the art that various changes can be made to the described examples without departing from the scope of the invention as set forth in the following claims.

What is claimed is:

1. A service registry comprising:

an input for receiving service parameters from a plurality of service providers;

a memory for storing information including metadata elements used to describe and uniquely identify services offered by the service providers that are to be provided over a plurality of broadcasting systems;

a processor coupled to the memory;

a resource manager interface for supplying a service definition to a resource manager, and for receiving salable packages constructed by the resource manager in response to the service definition; and a core interface for exchanging messages between the processor and the plurality of broadcasting systems, the processor being programmed to output the salable packages to an importer in at least one of the broadcasting systems.

2. The service registry of claim 1, wherein the information stored in the memory comprises salable packages for conditional access services.

3. The service registry of claim 1, wherein the information stored in the memory comprises service provider registration information.

4. The service registry of claim 1, wherein the information stored in the memory comprises importer license key information.

5. The service registry of claim 1, wherein the messages comprise:

resource related messages;

service related messages;

importer related messages; and general and executive messages.

6. The service registry of claim 1, wherein the messages include an authentication element.

7. A method comprising:

receiving service parameters from a plurality of service providers;

storing information including metadata elements used to describe and uniquely identify services offered by the service providers that are to be provided over a plurality of broadcasting systems;

supplying a service definition to a resource manager;

constructing salable packages at the resource manager in response to the service definition;

storing the salable packages of information in a service registry;

transmitting the salable packages and a license key to a plurality of broadcasters; and broadcasting the salable packages as authorized by the license key.

8. The method of claim 7, wherein the salable packages are broadcast in combination with a decryption key allowing a user to decrypt the salable packages of information.

9. The method of claim 7, wherein salable packages of information comprise:

information to be transmitted on conditional access services.

10. A broadcasting system comprising:

a plurality of transmitters;

an importer for each of the transmitters;

service registry including an input for receiving service parameters from a plurality of service providers; a memory for storing salable packages constructed by a resource manager in response to the service parameters; and a core interface for outputting the salable packages to the importers in response to subscription requests; and wherein the salable packages include conditional access content and each importer encrypts the conditional access content for subsequent broadcast by the transmitter.

11. The broadcasting system of claim 10, wherein the conditional access content comprises salable packages for conditional access services.

12. The broadcasting system of claim 10, wherein the service parameters further comprises service provider registration information and service metadata information.

13. The broadcasting system of claim 10, wherein the service parameters further comprises importer license key information.

14. The broadcasting system of claim 10, wherein the conditional access content is provided by multiple service providers.

15. The broadcasting system of claim 10, wherein the transmitter broadcasts the conditional access content with an activation key.

* * * * *